US012654184B2

(12) United States Patent
Erickson et al.

(10) Patent No.: US 12,654,184 B2
(45) Date of Patent: Jun. 16, 2026

(54) FLUID ATOMIZER

(71) Applicant: 3M INNOVATIVE PROPERTIES COMPANY, St. Paul, MN (US)

(72) Inventors: Ryan D. Erickson, Roseville, MN (US); Mark S. Menzenski, Hudson, WI (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 371 days.

(21) Appl. No.: 18/018,841

(22) PCT Filed: Jul. 26, 2021

(86) PCT No.: PCT/IB2021/056773
§ 371 (c)(1),
(2) Date: Jan. 30, 2023

(87) PCT Pub. No.: WO2022/023955
PCT Pub. Date: Feb. 3, 2022

(65) Prior Publication Data

US 2023/0311140 A1 Oct. 5, 2023

Related U.S. Application Data

(60) Provisional application No. 63/059,445, filed on Jul. 31, 2020.

(51) Int. Cl.
*B05B 7/08* (2006.01)
*B05B 7/02* (2006.01)

(52) U.S. Cl.
CPC ............ *B05B 7/0815* (2013.01); *B05B 7/025* (2013.01)

(58) Field of Classification Search
None
See application file for complete search history.

(56) References Cited

U.S. PATENT DOCUMENTS 1,179,905 A * 4/1916 Engelmann ............ E03C 1/046 239/521
3,635,400 A 1/1972 Nord et al.
(Continued)

FOREIGN PATENT DOCUMENTS

DE 3417229 A1 11/1985
DK 179997 B1 1/2020
(Continued)

OTHER PUBLICATIONS

International Search Report for PCT Application No. PCT/IB2021/056773, mailed on Nov. 8, 2021, 5 pages.

*Primary Examiner* — Christopher S Kim
(74) *Attorney, Agent, or Firm* — Martha J. Engel; Melissa E. Buss; Jonathan V. Sry

(57) ABSTRACT

A fluid atomizer comprising a body having a front surface, a rear surface and a body axis extending from the front to rear surfaces. The body comprises a first fluid outlet disposed in the front surface of the body, a first fluid inlet, and a first fluid passageway connecting the first fluid inlet with the first fluid outlet. The first fluid outlet defines an arcuate slit. The body further comprises a second fluid outlet disposed in the front surface of the body, a second fluid inlet, and a second fluid passageway connecting the second fluid inlet with the second fluid outlet. A shelf having an attraction surface protrudes from the front surface of the body. The second fluid outlet is located between the first fluid outlet and the shelf. The atomizer can be used in apparatus and methods utilizing atomized fluid.

4 Claims, 11 Drawing Sheets

(56) References Cited

U.S. PATENT DOCUMENTS

| | | | |
|---|---|---|---|
| 4,324,361 | A | 4/1982 | Moos et al. |
| 5,148,982 | A | 9/1992 | Ekhoff |
| 7,793,859 | B2 | 9/2010 | Kolb et al. |
| 8,827,183 | B2 | 9/2014 | Jones |
| 9,630,189 | B2 | 4/2017 | Swan |
| 9,631,855 | B2 | 4/2017 | Dodson |
| 2018/0154381 | A1 | 6/2018 | Bewlay |

FOREIGN PATENT DOCUMENTS

| | | | |
|---|---|---|---|
| EP | 2626142 | A1 | 8/2013 |
| GB | 313122 | A | 8/1930 |
| WO | 2018104870 | A1 | 6/2018 |
| WO | 2018157066 | A1 | 8/2018 |
| WO | 2020020996 | A1 | 1/2020 |

* cited by examiner

FLUID ATOMIZER

CROSS REFERENCE TO RELATED APPLICATIONS

This application is a national stage filing under 35 U.S.C. 371 of PCT/IB2021/056773, filed Jul. 26, 2021, which claims the benefit of U.S. Application No. 63/059,445, filed Jul. 31, 2020, the disclosure of which is incorporated by reference in its/their entirety herein.

FIELD OF THE INVENTION

The present invention relates to atomizers that transform a fluid into a spray or mist of fine droplets. The present invention further relates to apparatus that contain such atomizers and methods of use. The atomizers can dispense a variety of fluids, including disinfectants, chemical reagents, and various coatings.

BACKGROUND

Atomizers are devices that transform a fluid into a fine spray or mist of droplets. The size and shape of an atomizer can depend upon the desired application and/or delivery system. Applications over the years have included delivery of liquid hydrocarbon feeds in fluidized catalytic cracking processes, dispensing of chemical insecticides, and application of surface coatings.

Atomizers are currently utilized in hand-held liquid spray guns that can be used, for example, in vehicle repair body shops to apply liquid coating media such as primer, paint and/or clearcoat to vehicle parts. Typically, the spray gun is made of solid metal or plastic and includes a platform and spray head assembly. The spray head assembly includes a nozzle for dispensing the liquid, one or more atomizing air outlets to atomize the liquid as it exits the nozzle, and two or more shaping air outlets to shape the atomized liquid into the desired spray pattern. The spray gun contains a series of internal passages that distribute air from an air supply manifold in the platform to the atomizing air outlet(s) and shaping air outlets in the spray head assembly. Atomization of fluids by this technique is sometimes referred to as air-atomizing, air-spray, air-assist or air-blast atomization, and an exemplary spray gun using such a technique is disclosed, for example, in WO 2018/104870 and illustrated in FIG. 1. Spray guns are specialized tools that can be expensive to manufacture and time-consuming to maintain. Users typically undergo specialized training to learn how to manually adjust the complex combination of atomizing air outlets and shaping air outlets to obtain the desired spray pattern.

SUMMARY

The present disclosure provides an atomizer that both atomizes and shapes a fluid using a simplified but elegant design. The atomizer of the present disclosure allows the user to efficiently create a flat fan pattern of atomized fluid for use in a variety of applications, including the application of liquid coating media such as primer, paint and/or clearcoat to vehicle parts. The fluid atomizer of the present disclosure may reduce air consumption, reduce noise generation, reduce power consumption and/or increase coating transfer efficiency when contrasted with current hand-held liquid spray guns. Although the atomizer of the present disclosure is designed to address some of the drawbacks associated with current hand-held liquid spray guns as mentioned above, it should be understood that the atomizer disclosed herein could be easily configured for other devices and/or applications requiring the atomization of fluid.

In one embodiment, the present disclosure provides an atomizer comprising a body that includes a front surface, a rear surface and a body axis extending from the front surface to the rear surface. The body comprises a first fluid outlet disposed in the front surface of the body, a first fluid inlet, and a first fluid passageway connecting the first fluid inlet with the first fluid outlet. The first fluid outlet defines an arcuate slit. The body further comprises a second fluid outlet disposed in the front surface of the body, a second fluid inlet, and a second fluid passageway connecting the second fluid inlet with the second fluid outlet. A shelf protrudes from the front surface of the body. The second fluid outlet is located between the first fluid outlet and the shelf.

In another embodiment, the present disclosure provides a spraying apparatus comprising the atomizer, a first fluid source fluidly connected to the first fluid inlet, and a second fluid source fluidly connect to the second fluid inlet.

In a further embodiment, the present disclosure provides a method of using the spraying apparatus, the method comprising placing the atomizer in front of a substrate, dispensing a first fluid through the first fluid outlet, dispensing a second fluid through the second fluid outlet, atomizing at least a portion of the second fluid to produce a flat fan pattern of atomized fluid, and coating the substrate with the atomized fluid.

In yet a further embodiment, the present disclosure provides a method of creating a flat fan spray with the spraying apparatus, the method comprising dispensing gas from the first fluid outlet, producing a negative pressure on the shelf adjacent the second fluid outlet, and dispensing and atomizing a fluid from the second fluid outlet.

The term "comprises" and variations thereof do not have a limiting meaning where these terms appear in the description and claims. Such terms will be understood to imply the inclusion of a stated step or element or group of steps or elements but not the exclusion of any other step or element or group of steps or elements. The term "consisting of" is limited to whatever follows the phrase "consisting of." Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

In this application, terms such as "a," "an," and "the" are not intended to refer to only a singular entity, but include the general class of which a specific example may be used for illustration. The terms "a," "an," and "the" are used interchangeably with the phrases "at least one" and "one or more." The phrases "at least one of" and "comprises at least one of" followed by a list refers to any one of the items in the list and any combination of two or more items in the list.

The term "or" is generally employed in its usual sense including "and/or" unless the content clearly dictates otherwise.

The term "and/or" means one or all of the listed elements or a combination of any two or more of the listed elements.

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

Reference throughout this specification to "some embodiments" means that a particular feature, configuration, composition, or characteristic described in connection with the embodiment is included in at least one embodiment of the disclosure. Thus, the appearances of such phrases in various places throughout this specification are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances; however, other embodiments may also be preferred, under the same or other circumstances. Furthermore, the recitation of one or more preferred embodiments does not imply that other embodiments are not useful, and is not intended to exclude other embodiments from the scope of the disclosure.

The words "top", "bottom", "front" and "rear" are relative terms that are not meant to apply a particular orientation in space.

The word "pressure", unless otherwise noted, refers to the gauge pressure (i.e., measurement of fluid pressure relative to ambient atmospheric pressure). A fluid pressure above ambient atmospheric pressure exhibits positive pressure and a fluid pressure below ambient atmospheric pressure exhibits negative pressure. Negative pressure conditions can also be referred to as "a vacuum", "a partial vacuum", or "suction conditions".

The word "hydrostatic pressure" refers to the pressure that is exerted by a fluid at equilibrium at a given point within the fluid, due to the force of gravity. Hydrostatic pressure increases in proportion to depth as measured from the surface due to the increasing fluid weight exerting downward force from above. Hydrostatic pressure can be used to describe the effect of a liquid reservoir which acts as a fluid source connected to an atomizer. The height, and thus the weight, of the fluid in the reservoir will impart a motive force on the fluid entering the atomizer.

The word "fluid" refers to one or more flowable materials including, for example, a solid, a liquid, a gas or combinations thereof. The fluid can be a single material or a combination of two or more materials of the same or different phase (e.g., a slurry of solvent and solid particles). In the case of liquid spray guns used in vehicle repair, fluid may include paints, primers, base coats, lacquers, varnishes and similar paint-like materials as well as other materials, such as adhesives, sealer, fillers, putties, powder coatings, blasting powders, abrasive slurries, mold release agents and foundry dressings.

The above summary of the present disclosure is not intended to describe each disclosed embodiment or every implementation of the present disclosure. The description that follows more particularly exemplifies illustrative embodiments.

BRIEF DESCRIPTION OF THE DRAWINGS

Throughout the specification, reference is made to the appended drawings, where like reference numerals designate like elements, and wherein.

With reference to the figures, like reference numbers offset by multiples of 100 (e.g., 20, 220 and 320) indicate like elements. Unless otherwise indicated, all figures and drawings in this document are not to scale and are chosen for the purpose of illustrating different embodiments of the invention. In particular, the dimensions of the various components are depicted in illustrative terms only, and no relationship between the dimensions of the various components should be inferred from the drawings, unless so indicated.

DETAILED DESCRIPTION

Figure 1:
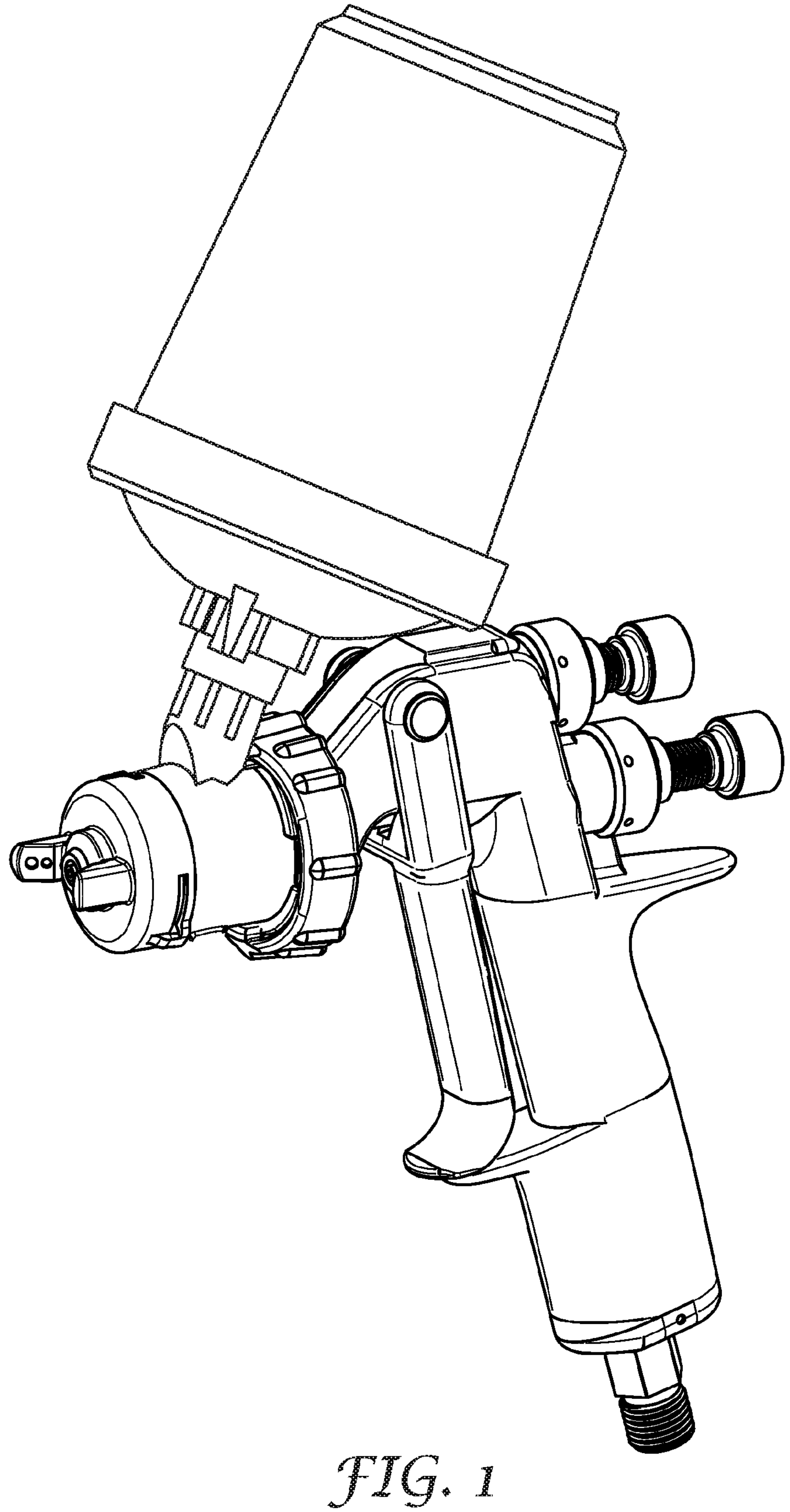
FIG. 1 is a perspective view of a current air-assist liquid spray gun.
Figure 2:
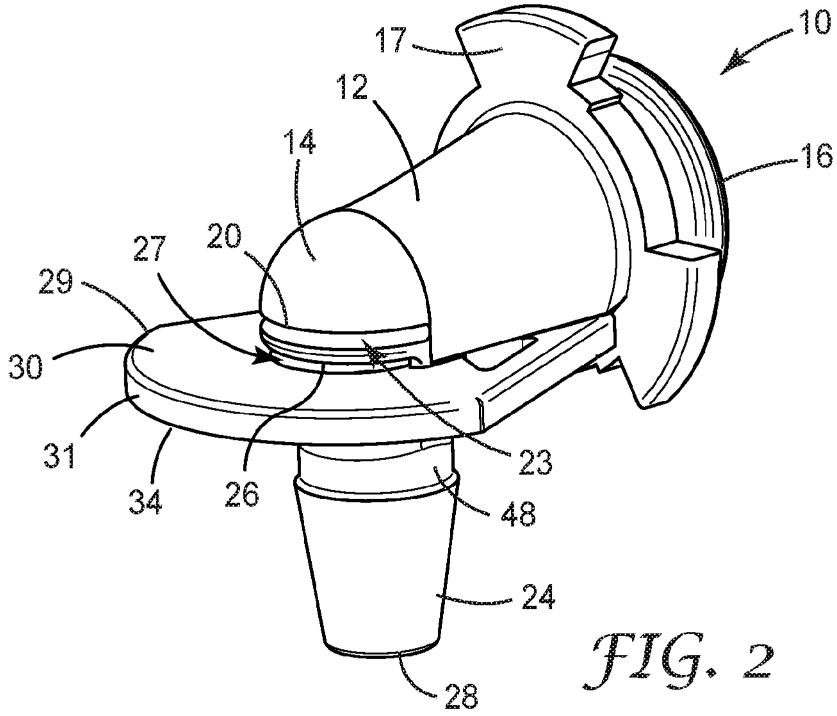
FIG. 2 is a perspective view of one embodiment of a fluid atomizer of the present application.
Figure 3:
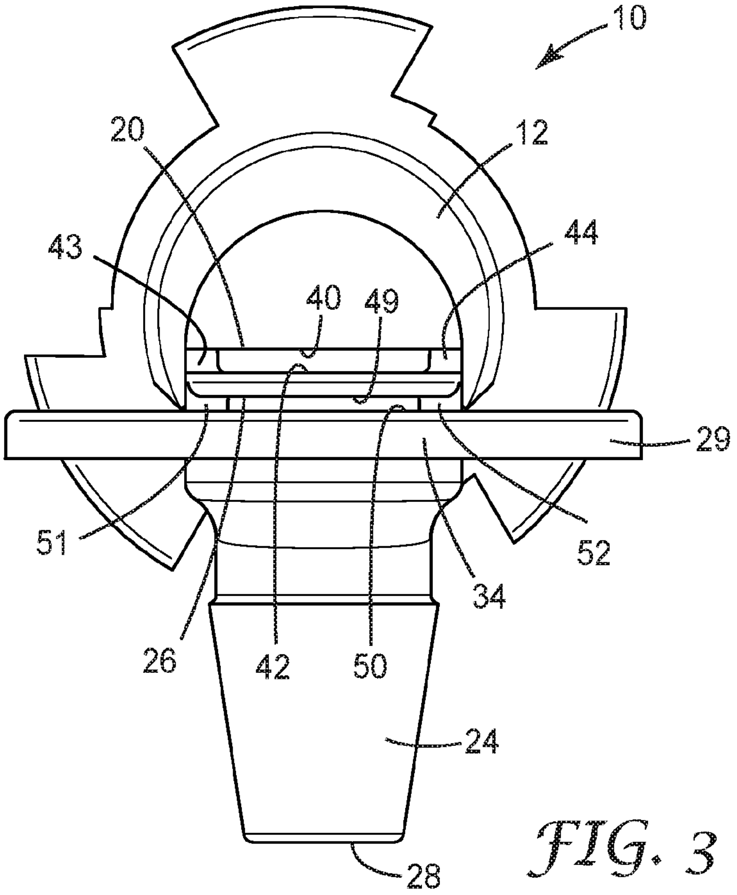
FIG. 3 is a front view of the fluid atomizer of FIG. 2.
Figure 4:
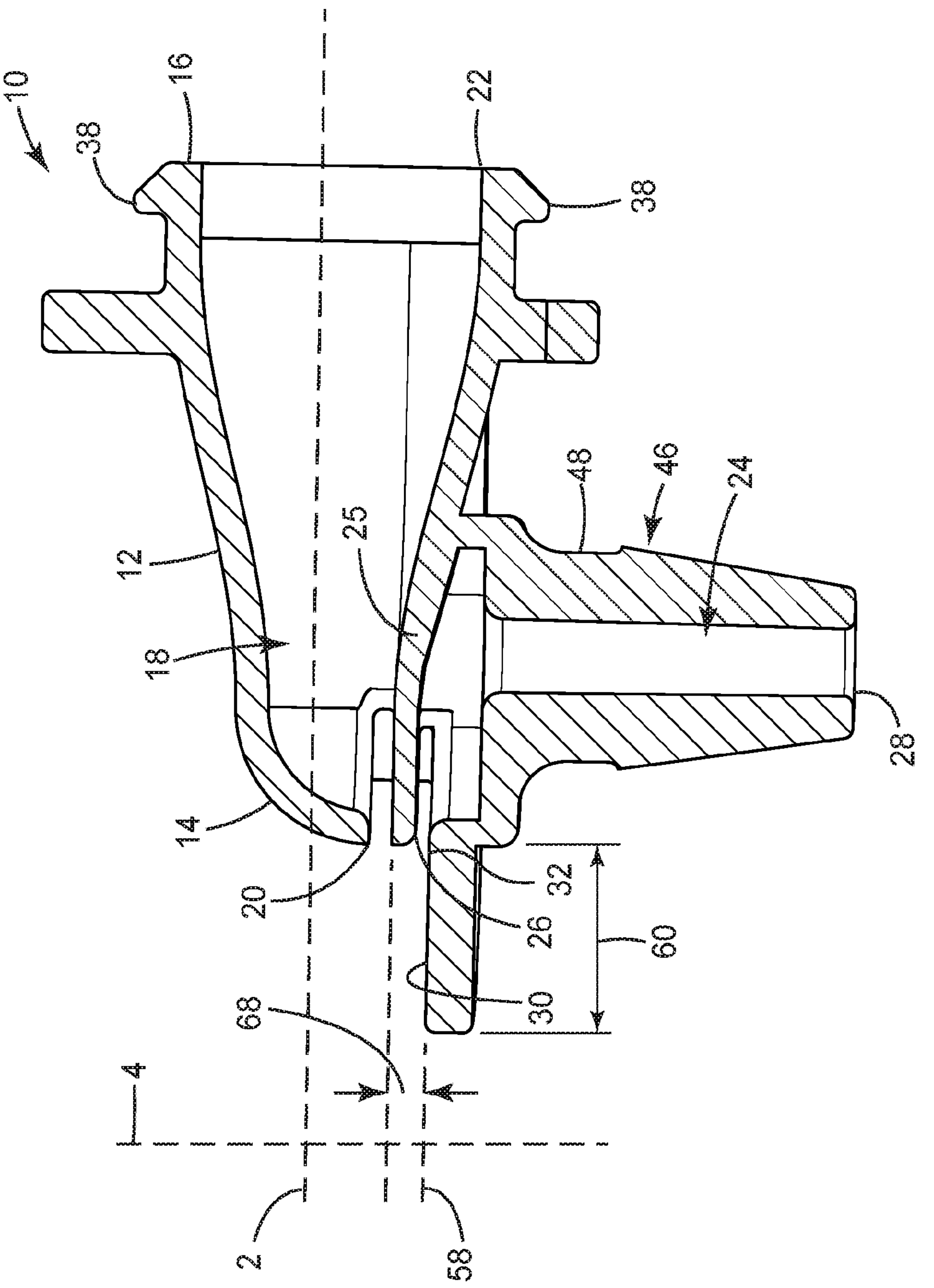
FIG. 4 is a cross-sectional side view of the fluid atomizer of FIG. 2.

FIGS. 2-4 illustrate a first embodiment of a fluid atomizer 10 of the present application. The atomizer 10 includes a body 12 having a front surface 14, a rear surface 16 and a body axis 2 extending from the front surface 14 to the rear surface 16. A first fluid passageway 18 is disposed within the body 12 and comprises a first fluid outlet 20 disposed in the front surface 14 of the body 12 and a first fluid inlet 22. The first fluid outlet 20 defines an arcuate slit 23. In at least one embodiment, the term arcuate refers to a shape or a wall that is arch-like in at least one dimension. The term "arcuate slit" can refer to one or more holes formed in the arcuate shape or wall therein. In at least one embodiment, a body axis 2 can form a plane that is at least parallel to the arcuate slit. The body axis 2 can be parallel to the body axis can intersect or even bisect the arcuate slit. In at least one embodiment, the slits can be long, narrow openings including a plurality of openings arranged to produce a long narrow pattern. Slits can include oval, rectangles, stadium, or super-ellipsoidal shapes. The arcuate slit 23 can be defined by any curve/arch shape including segmented curves. In at least one embodiment, the arcuate slit 23 can radially diverge from the body axis 2.

A second fluid passageway 24 is also disposed within the body 12 and comprises a second fluid outlet 26 disposed on the front surface 14 of the body 12 and a second fluid inlet 28.

In at least one embodiment, a wall 25 can separate the first fluid passageway 18 from the second fluid passageway 24. The wall 25 can be integrally formed with the body 12 such that one side of the wall 25 is in fluid communication to the first fluid passageway 18 and the opposing side of the wall 25 is in fluid communication to the second fluid passageway 24. In at least one embodiment, the edge of the wall 25 can form part of the first fluid outlet 20 and the second fluid outlet 26. In at least one embodiment, the wall 25 does not protrude significantly past the front surface 14. A shelf 29 protrudes from the front surface 14. In at least one embodiment, the shelf 29 can be configured to modify the atomization and/or shaping of the fluid from second fluid passageway 24 as described herein. The second fluid outlet 26 is located between the first fluid outlet 20 and shelf 29.

The first fluid outlet 20 generally comprises a first end 43, a second end 44, a top 40 and a bottom 42, where the top 40 and bottom 42 each extend from the first end 43 to the second end 44 of the first fluid outlet 20. The first end 43, second end 44, top 40 and bottom 42 of the first fluid outlet 20 define the arcuate slit 23 through which a first fluid can be dispensed from the atomizer 10. The corners formed at the intersection of the top 40 and bottom 42 with the first and second ends 43, 44 may be squared, rounded or a combination thereof. In a preferred embodiment, as illustrated in FIG. 4, each of the corners is rounded to reduce or eliminate secondary flows that may occur with squared or sharp corners. Secondary flows can produce eddies and vortices that may disrupt the uniformity of the atomized fluid spray pattern.

Although the first end 43, second end 44, top 40 and bottom 42 of the first fluid outlet 20 in FIGS. 2-4 are featureless, in other embodiments, one or more of the first end 43, second end 44, top 40 and bottom 42 may include one or more features (e.g., grooves, partitions, vortex generators, pillars/posts, and various textures). In one embodiment, at least one of the first end 43, second end 44, top 40 and bottom 42 of the first fluid outlet 20 comprises one or more grooves.

As illustrated in FIG. 2, the portion of the front surface 14 of the body 12 comprising the first fluid outlet 20 projects outward along the body axis 2 so that the midpoints of the top 40 and bottom 42 of the first fluid outlet 20 project further outward than the first and second ends 43, 44, thus forming the arcuate slit 23. Although the front surface 14 of the body 12 in FIG. 2 is partially spherical (e.g., comprised of two consecutive quadrants of a sphere), it should be understood that the front surface of the body can take on any configuration as long as the portion containing the first fluid outlet provides for an arcuate slit. For example, in an alternative embodiment, as illustrated by the fluid atomizer 310 in FIG. 12, the front surface 314 forms part of a cylinder, and the top 340 and bottom 342 of the first fluid outlet 320 are defined by arcs along the circumference of the cylinder. In another embodiment, the front surface of the body can be formed by one end of an oblong sphere (e.g., ellipsoid), such that the midpoints of the top and bottom of the first fluid outlet project even further outward from the first and second sends than illustrated in FIG. 2. The curvature in the arcuate slit is not particularly limiting and can form a circular or non-circular arc. In preferred embodiments, such as that illustrated in FIGS. 2-4, the curvature in the arcuate slit is symmetric about a plane that extends along the body axis 2 and is orthogonal to the shelf 29.

In at least one embodiment, an aspect of the present disclosure can be that the body 12 does not include additional valves, air horns, needle valves which simplifies construction, improves reliability, and allows for injection molding.

In some embodiments, irrespective of the curvature, the first fluid outlet 20 projects a rectangular shape onto a plane 4 that is substantially orthogonal to the body axis 2, as illustrated in FIG. 4. As used herein, the term "substantially orthogonal" means that the plane 4 forms an angle with the body axis 2 that is at least 85 degrees and no greater than 95 degrees. As used herein, the term "rectangular shape" means a four-sided polygon having one set of parallel sides orthogonal to a second set of parallel sides. The two sets of parallel sides may be the same length (i.e., form a square). In a preferred embodiment, one set of parallel sides is longer than the other set of parallel sides. The sides may be regular or irregular (e.g., curved sawtooth pattern, curved sinusoidal pattern, a discretized or stepped curve pattern, and combinations thereof), and the corners of the polygon may be squared, rounded or a combination thereof.

The first fluid outlet 20 illustrated in FIGS. 2-4 forms a single, uninterrupted slit. In other embodiments, the first fluid outlet can be partitioned into two or more sections to create a plurality of openings. The openings can be of varied or uniform shapes and/or sizes. The walls making up each section can be featureless. Alternatively, one or more walls making up a section can include one or more features (e.g., grooves, pillars/posts, and various textures).

Although the dimensions of the first fluid outlet may vary with application, in some preferred embodiments, the first fluid outlet is longer than it is high. In some embodiments, the length of the fluid outlet is at least 1.01-100 times as great as its height, more particularly 10-30 times as great as its height. The length, as used herein, is the arcuate length as measure from the first end 43 to the second end 44 along either the top 40 or bottom 42 of the first fluid outlet 20, whichever is greater. The height, as used herein, is the average distance between the top 40 and the bottom 42 of the first fluid outlet 20.

The first fluid outlet 20 is fluidly connected the first fluid inlet 22 by the first fluid passageway 18. The first fluid inlet 22 is disposed on the surface of the body 12 and connects either directly or indirectly to a first fluid source. The location of the first fluid inlet 22 is not particularly limiting but is generally positioned so that the fluid source does not interfere with the atomization and dispensing of fluid. In one embodiment, as illustrated in FIG. 4, the first fluid inlet 22 is located on the rear surface 16 of the body 12. In an alternative embodiment, the first fluid inlet is located on the front surface 14 of the body 12. In yet other embodiments, the first fluid inlet is located on portions of both the front surface 14 and rear surface 16 of the body 12.

Figure 12:
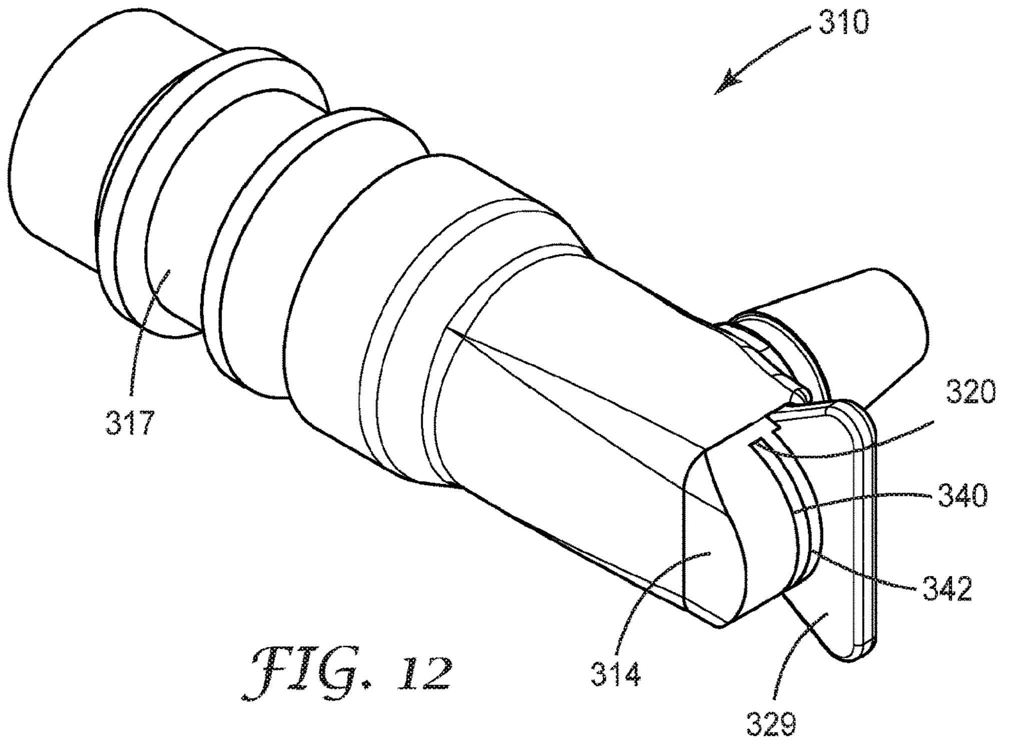
FIG. 12 is a perspective view of yet another embodiment of a fluid atomizer of the present application.
Figure 13:
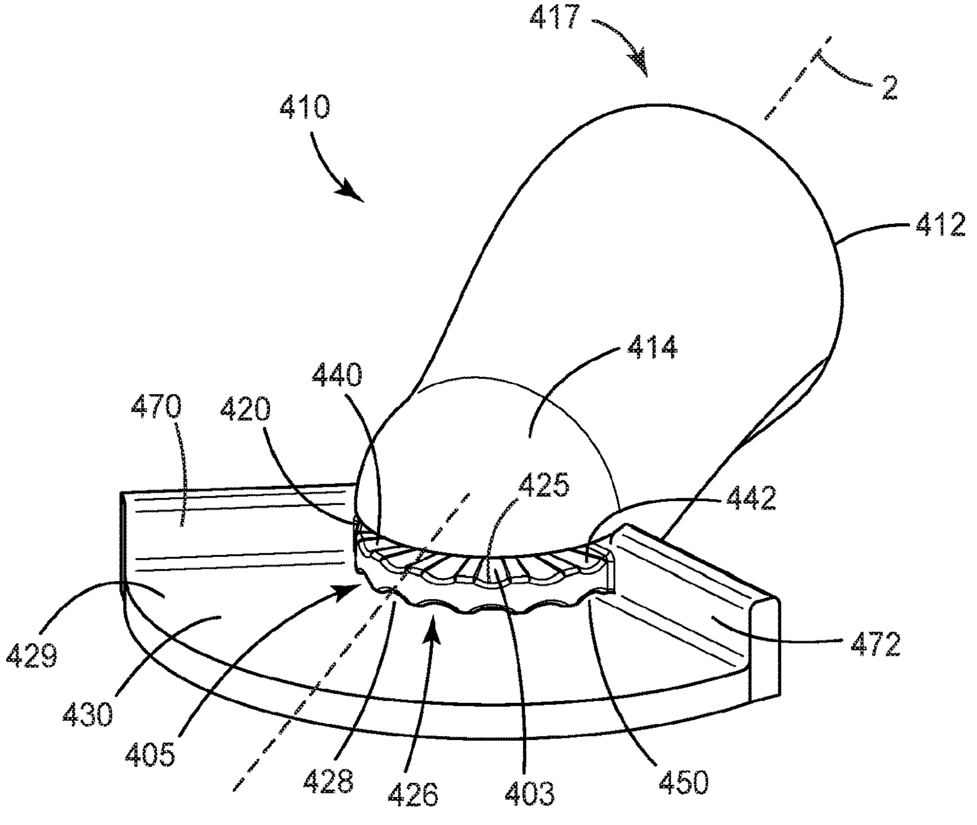
FIG. 13 is a perspective view of another embodiment of the fluid atomizer of the present application.
Figure 14:
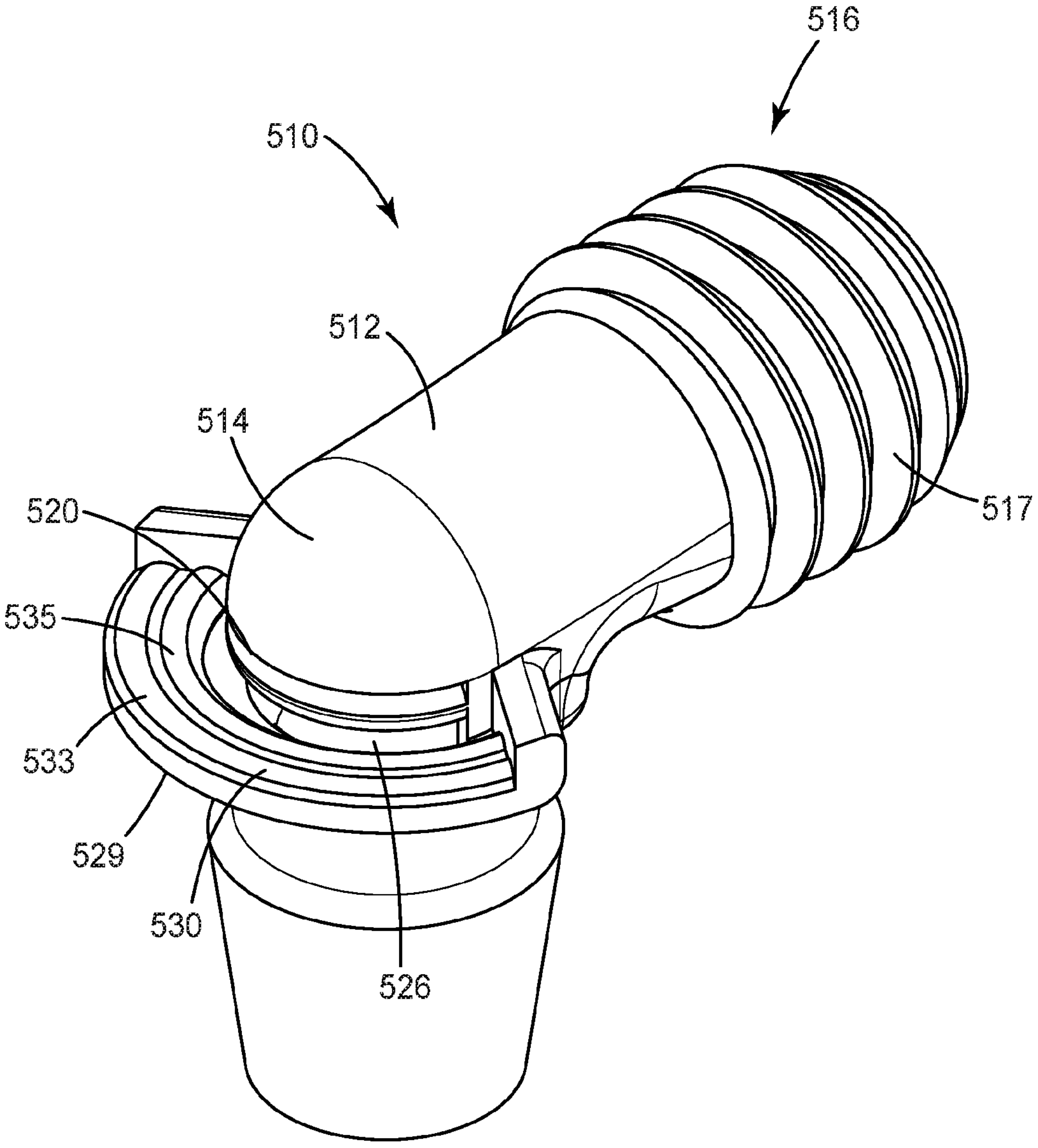
FIG. 14 is a perspective view of another embodiment of the fluid atomizer of the present application.
Figure 17:
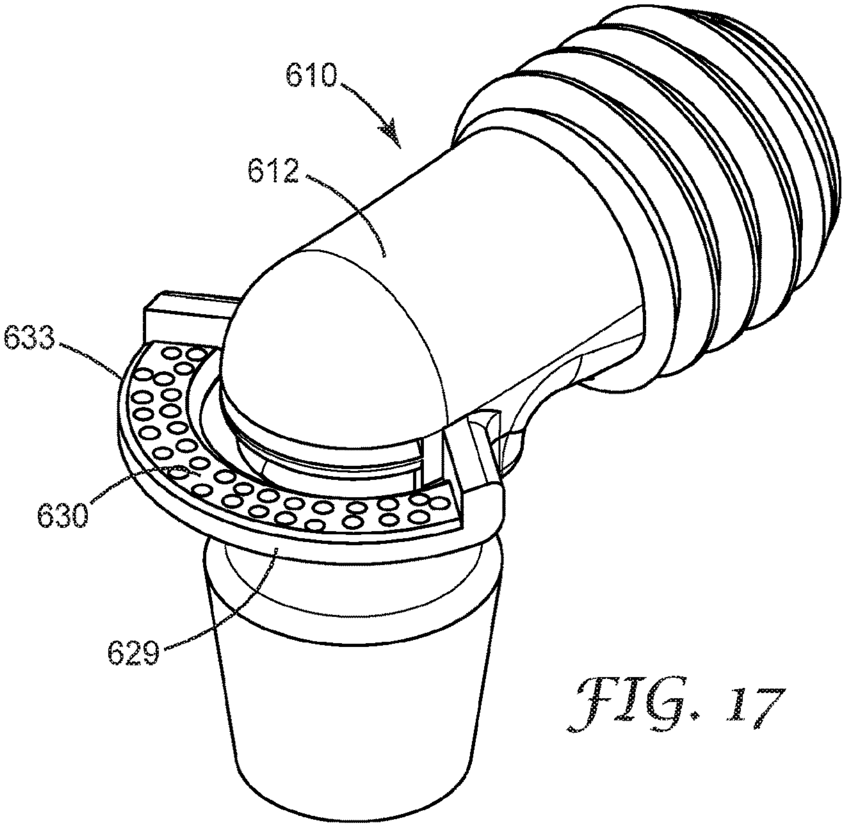
FIG. 17 is a perspective view of another embodiment of the fluid atomizer of the present application.

The shape of the first fluid inlet 22 is not particularly limiting. However, the portion of the body containing the first fluid inlet 22 is typically configured to attach either directly or indirectly to an external first fluid source. In at least one embodiment, a connection mechanism 17 can be disposed proximate to the rear surface 16. The connection mechanism 17 can be configured to releasably attach the body 12 to a fluid actuator (e.g., a spray gun, or first fluid actuator 106 in FIG. 5). As shown, the connection mechanism 17 is a twist-lock attachment, but other configurations are possible such as thread-on, bayonet-style, push-fit, snap-lock, quick-connect, compression fitting, hose barb, ultrasonic welding, spin-welding, overmolding, or crimp-style connections. For example, FIG. 12 illustrates a connection mechanism 317 that is a push-fit having an external shelf. FIG. 13 illustrates a connection mechanism 417 that is an internal thread-on connection. FIG. 14 illustrates a connection mechanism 517, FIG. 17 illustrates a connection mechanism 617, that are external thread-on connections. In the exemplary embodiment of FIG. 4, the first fluid inlet 22 comprises tabs 38 configured to mate with a complementary means of attachment, such as slots in the housing of a first fluid source or the slots in a conduit (e.g., tubing) used to supply the first fluid from the first fluid source.

The first fluid passageway 18 fluidly connects the first fluid inlet 22 with the first fluid outlet 20. The first fluid passageway 18 can take on any suitable shape or route within the body. In some embodiments, at least a portion of the first fluid passageway is a cylindrical cavity having a constant cross-sectional area throughout. In alternative embodiments, at least a portion of the first fluid passageway is a cylindrical cavity in which the cross-sectional area of the first fluid passageway varies from the first fluid inlet to the first fluid outlet. In a preferred embodiment, as illustrated in FIG. 4, at least a portion of the first fluid passageway 18 is a cylindrical cavity where the cross-sectional area decreases from the first fluid inlet 22 to the first fluid outlet 20, thus decreasing the pressure and increasing the velocity with which the first fluid exits the first fluid outlet 20.

The second fluid outlet 26 is disposed on the front surface 14 of the body 12 between the first fluid outlet 20 and the shelf 29. The second fluid outlet 26 comprises a top 49, a bottom 50, a first end 51, and a second end 52 that together define an opening 27. Although the dimensions of the second fluid outlet 26 may vary with application, typically the length of the second fluid outlet 26 is no greater than the length of the first fluid outlet 20, where length is measured from the first end 51 to the second end 52 along either the top 49 or bottom 50 of the second fluid outlet 26, whichever is greater. In preferred embodiments, the length of the second fluid outlet 26 is greater than the average distance between the top 49 and bottom 50 of the second fluid outlet 26. However, the shape of the second fluid outlet 26 is not particularly limiting. In some embodiments, like that illustrated in FIGS. 2-4, the opening 27 of the second fluid outlet 26 is an arcuate slit similar to that described with respect to the first fluid outlet 20. In alternative embodiments, the opening 27 can be in the shape of a regular or an irregular oval, rectangle or semicircle. In some embodiments, the second fluid outlet 26 projects a rectangular shape onto the plane 4 substantially orthogonal to the body axis 2.

In some embodiments, as illustrated in FIGS. 2-4, the first end 51, second end 52, top 49 and bottom 50 of the second fluid outlet 26 are featureless. In other embodiments, one or more of the first end 51, second end 52, top 49 and bottom 50 include one or more features (e.g., grooves, partitions, vortex generators, pillars/posts, and various textures). In one embodiment, at least one of the first end 51, second end 52, top 49 and bottom 50 of the second fluid outlet 26 comprises one or more grooves.

Figure 10:
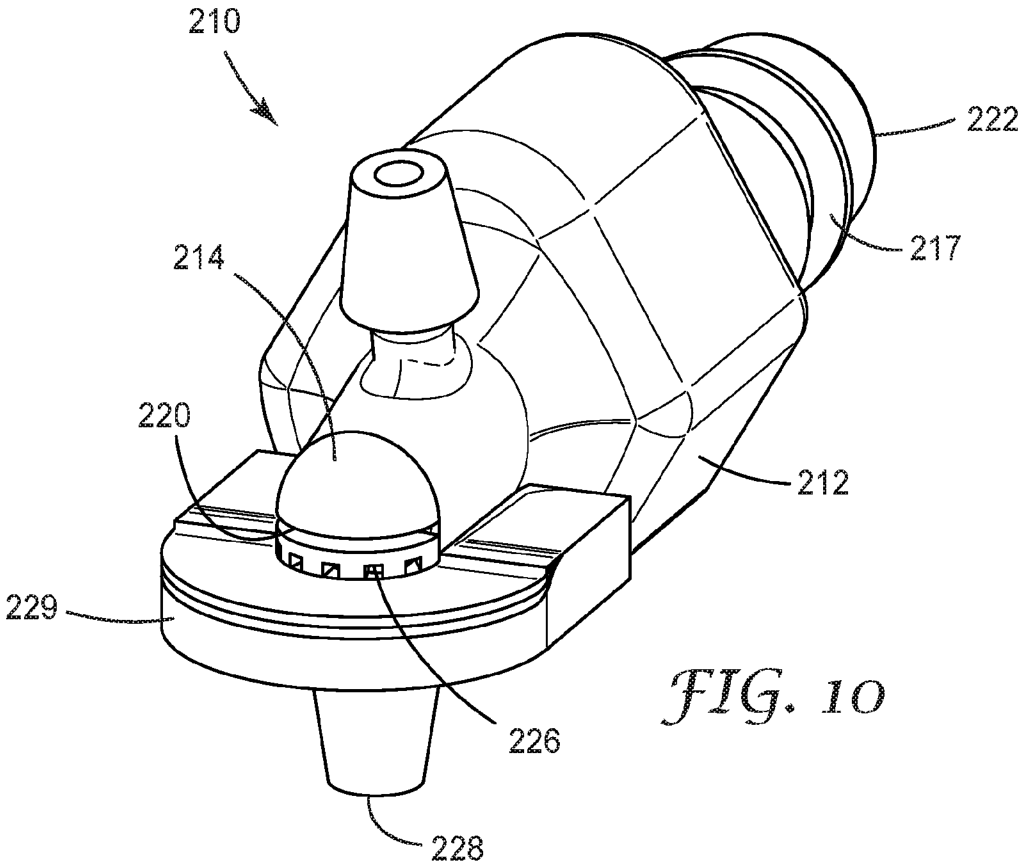
FIG. 10 is a schematic perspective view of another embodiment of the fluid atomizer of the present application.
Figure 11:
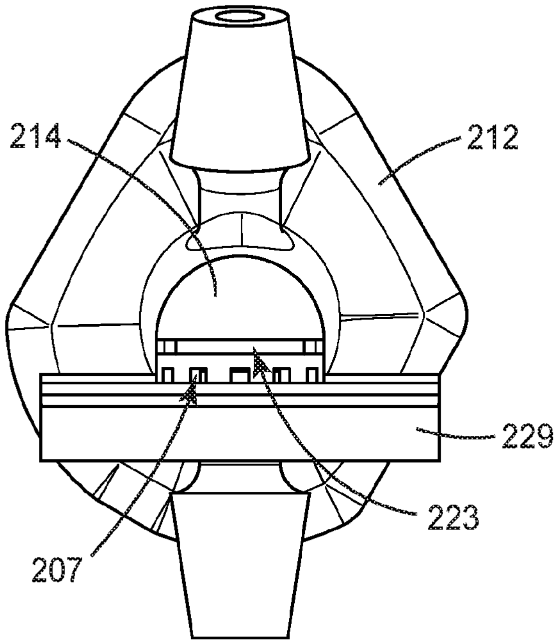
FIG. 11 is a schematic front view of the fluid atomizer of FIG. 10.

Although the second fluid outlet 26 illustrated in FIGS. 2-4 forms a single, uninterrupted slit, in other embodiments, the second fluid outlet can be partitioned into two or more sections creating a plurality of openings (e.g., the atomizer illustrated FIGS. 10 and 11). The openings can be of varied or uniform shapes and/or sizes. The walls making up each section can be featureless. Alternatively, one or more walls making a section can include one or more features (e.g., grooves, pillars/posts, and various textures).

The second fluid outlet 26 and first fluid outlet 20 may be flush or aligned on the front surface as illustrated in FIG. 4. However, it should be understood that the second fluid outlet 26 may be behind or in front of the first fluid outlet 20.

The second fluid outlet 26 is fluidly connected the second fluid inlet 28 by the second fluid passageway 24. The location of the second fluid inlet 28 is not particularly limiting but the second fluid inlet 28 is generally positioned so that the second fluid source does not interfere with the first fluid source or the atomization and dispensing of fluid from the front surface 14 of the body 12. In one embodiment, as illustrated in FIG. 4, the second fluid inlet 28 is located on the front surface 14 of the body 12. In an alternative embodiment, the second fluid inlet is located on the rear surface 16 of the body 12. In yet other embodiments, the second fluid inlet is located on portions of both the front surface 14 and rear surface 16 of the body 12.

The shape of the second fluid inlet 28 is not particularly limiting. However, a portion 46 of the body 12 containing the second fluid inlet 28 is typically configured to mate either directly or indirectly with the second fluid source. In the embodiment illustrated in FIG. 4, the second fluid inlet 28 is disposed in a tapered portion 46 of the body 12 that allows for insertion of the second fluid inlet 28 into the housing of a second fluid source or conduit (e.g., tubing) used to supply the second fluid from the second fluid source. Grooves 48 on the tapered portion 46 can lock with, for example, a flange on the housing or conduit to secure the atomizer 10 to the second fluid source. The tapered portion 46 is only one exemplary means for connecting the atomizer 10 to a second fluid source. The body containing the second fluid inlet 28 can be easily configured for other known means of attachment, including threading, snap fit, press fit, quick disconnect, compression fitting, hose barb, ultrasonic welding, spin welding, and overmolding.

The second fluid passageway 24 fluidly connects the second fluid inlet 28 with the second fluid outlet 26. The second fluid passageway 24 can take on any suitable shape or route within the body 12. In some embodiments, as illustrated in FIG. 4, at least a portion of the second fluid passageway 24 is a cylindrical cavity having a constant cross-sectional area throughout. In alternative embodiments, at least a portion of the second fluid passageway 24 is a cylindrical cavity in which the cross-sectional area of the second fluid passageway 24 varies from the second fluid inlet 28 to the second fluid outlet 26. In some embodiments, at least a portion of the second fluid passageway 24 is a cylindrical cavity where the cross-sectional area decreases from the second fluid inlet 28 to the second fluid outlet 26, thus decreasing the pressure and increasing the velocity with which the second fluid exits the second fluid outlet 26.

The shelf 29 protrudes from the front surface 14 of the body 12 and comprises an anchored end 32 adjacent to the front surface 14 and an opposite free end 34. The shelf 29 can be integrally formed with the body 12, as illustrated in FIG. 4. Alternatively, the shelf 29 can be formed separately and attached to the body 12 by any suitable technique, including welding, snap fit, press fit, heat staked, and overmolding.

The shape of the shelf 29 is preferably designed so that fluid, irrespective of where it exits the second fluid outlet 26, travels the same distance across the shelf 29, thus providing uniform fluid flow. Although not a necessary feature, such configuration provides for a more uniform pattern of atomized fluid. In one embodiment, as illustrated in FIGS. 2-4, the free end 34 of the shelf 29 forms an arcuate edge 31 that extends about the front surface 14 of the body 12 and generally follows the shape of the arcuate slit 23 of the first fluid outlet 20. In an alternative embodiment, as illustrated in the embodiment in FIG. 12, the shelf 329 can form a polygonal shape, such as a triangular shape.

The shelf 29 has an attraction surface 30 on the side facing the fluid outlets 20, 26. The attraction surface 30 can be featureless (e.g., smooth), textured (e.g., three-dimensional structures), or a combination thereof. In some embodiments, at least a portion of the attraction surface 30 includes three-dimensional structures, such as dimples, grooves or channels, pillars or posts, vortex generators, tetrahedra, and combinations thereof. The three-dimensional structures may be arranged randomly or in a regular pattern. In some embodiments, the three-dimensional structures may be arranged randomly in at least one portion of the attraction surfaced and arranged in a regular pattern in at least one other portion of the attraction surface. Texturizing can induce additional shear forces and three-dimensionality of the flow in close proximity to the textured surface. Since this interaction between the surface and proximal fluid is known to exist, it may be used to augment turbulent fluid flow during operation. The benefits of turbulent mixing may include but are not limited to improved droplet dispersion, finer atomization, and diffusion of the mixed-phase velocity field.

The attraction surface may be parallel to, or angled with respect to, the body axis 2. With reference to FIG. 4, an attraction surface axis 58 extends from the midpoint of the anchored end 32 to the midpoint of the opposite free end 34 of the shelf 29. In some embodiments, the attraction surface axis 58 and body axis 2 form an angle that typically ranges from −20 to 20 degrees. In a preferred embodiment, the attraction surface axis 58 is substantially parallel to the body axis 2. As used herein, the term “substantially parallel” means that the angle formed between the two axes 58, 2 ranges from −10 to 10 degrees.

In the embodiment illustrated in FIGS. 2-4, the attraction surface 30 is planar. However, in alternative embodiments, the attraction surface is not planar. For example, the attraction surface can exhibit a convex, concave or wavy configuration.

The anchored end 32 of the attraction surface 30 can be disposed any suitable distance from the first fluid outlet 20, depending upon the size and application of the fluid atomizer. In some embodiments, the distance between the attraction surface 30 and the bottom 50 of the second fluid outlet 26 is no greater than the distance between the bottom 42 of the first fluid outlet 20 and the top 49 of the second fluid outlet 26, as measured in a direction orthogonal to the body axis. In more particular embodiments, the distance between the attraction surface 30 and the bottom 50 of the second fluid outlet 26 is less than the distance between the bottom 42 of the first fluid outlet 20 and the top 49 of the second fluid outlet 26, as measured in a direction orthogonal to the body axis. In some coating applications, the distance 68 between the bottom 42 of the first fluid outlet 20 and the attraction surface 30 measured in a direction orthogonal to the body axis 2 is greater than 0 mm and no greater than 30 mm. In one or more embodiments, this distance 68 is at least 0.5 mm and no greater than 2 mm.

The shelf length can have a large impact on vacuum pressure and smaller effect on atomization. In at least one embodiment, the dimensions of the shelf 29 are not particularly limiting and will vary with the size of the atomizer and the particular application. In some coating applications, the shelf 20 has a length 60 that ranges from 0.5 to 50 mm, as measured from the midpoint of the anchored end 32 to the midpoint of the opposite free end 34. In at least one embodiment, the height difference (distance 68) from the attraction surface 30 to the first fluid outlet bottom ledge on the shelf 25. The distance 68 can define the region/boundaries where the second fluid in a strong negative pressure state. In at least one embodiment, the body 12 can work with a length 60 to distance 68 ratio of at least 1. The length 60 to distance 68 ratio can range from 1 to 6, such as 3 to 5, inclusive.

Figure 8:
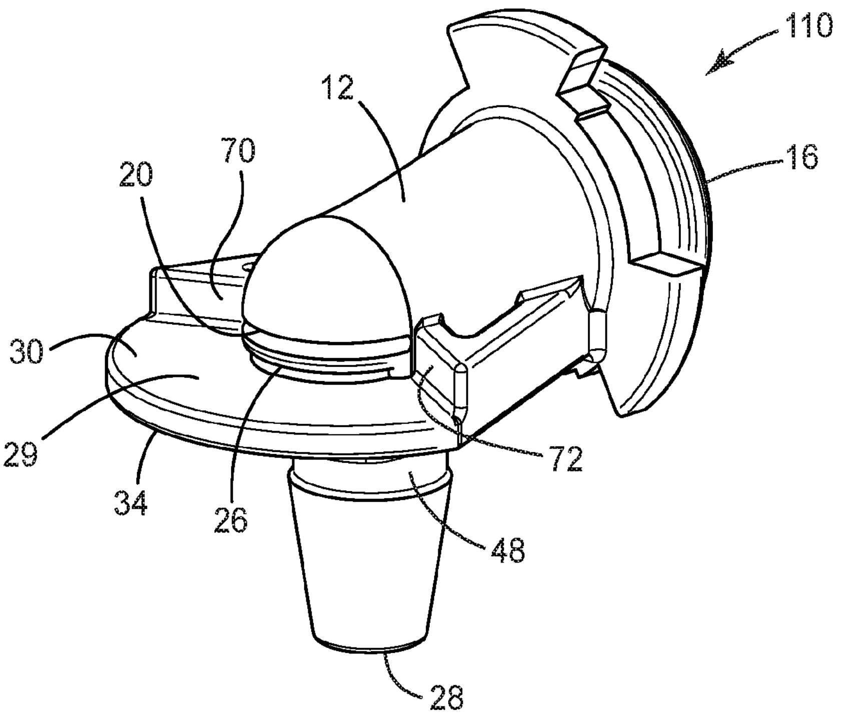
FIG. 8 is a perspective front view of the fluid atomizer of FIG. 2 with side walls.
Figure 9:
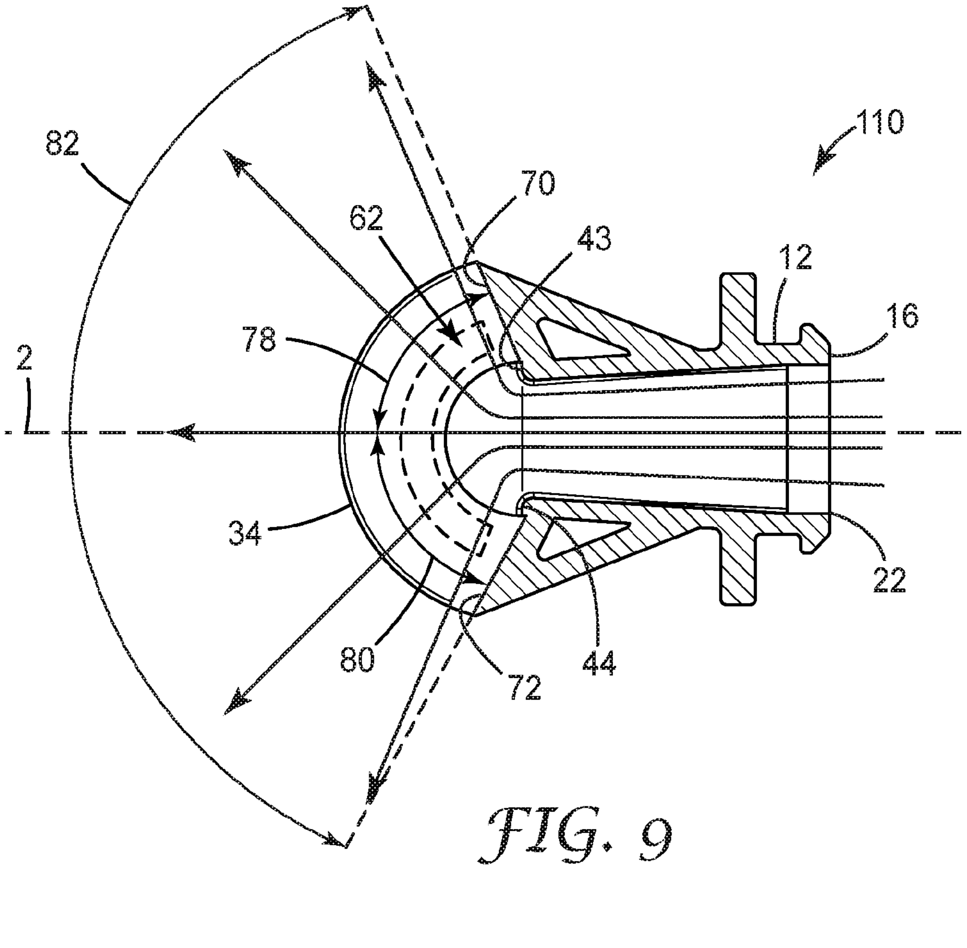
FIG. 9 is a cross-sectional top view of the fluid atomizer of FIG. 8.

FIGS. 8 and 9 show the atomizer 10 in FIGS. 2-4 with two optional walls 70, 72 that can be used to tailor the spray angle 82 of the atomized fluid as it leaves the spraying apparatus. The atomizer 110 comprises a first wall 70 disposed on the shelf 29 adjacent the first end 43 of the fluid outlet 20, and a second wall 72 disposed on the shelf 29 adjacent the second end 44 of the first fluid outlet 20. In some embodiments, each of the first and second walls 70, 72 forms an angle 78, 80, respectively, with the body axis 2 that is at least 5, 10, 20, 30, 50 or 70 degrees and no greater than 90, 80 or 70 degrees. In some embodiments, each of the first and second walls 70, 72 forms an angle 78, 80, respectively, with the body axis 2 that ranges from 5 to 90 degrees. The walls 70, 72 can be positioned to create spray angles 82 greater than 0, 40, 60, 100 or 140 degrees and no greater than 180, 160 or 140 degrees. In some embodiments, the spray angle 82 ranges from greater than 0 degrees to no greater than 180 degrees. In at least one embodiment, the spray angle 82 ranges from 0 degrees to no greater than 270 degrees.

The walls 70, 72 may be formed integrally with the body 12 of the atomizer. Alternatively, the walls 70, 72 can be formed separately and attached to the body 12 by any suitable technique, including welding, snap fit, press fit, heat staked and overmolding. In some embodiments, the spray angle is set for a particular atomizer during manufacture, thus requiring multiple atomizers having different wall angles to cover a range of spray angles and patterns. In a preferred embodiment, the walls 70, 72 of the atomizer are adjustable so that a single device can accommodate a range of spray angles and patterns. For example, the walls 70, 72 can be movable such that adjustment of wall 70 results in movement of wall 72 so that the angle is maintained without also having to adjust wall 72.

Although the walls 70, 72 in FIGS. 8 and 9 are featureless, in other embodiments, the walls 70, 72 may include one or more features (e.g., grooves, partitions, pillars/posts, and various textures n). In some embodiments, the walls are planar. In other embodiments, the walls are slightly curved outwards from the body axis 2 to increase the spread of the atomized fluid.

Atomizers of the present application can be assembled from two or more parts or integrally formed from a single material using a number of known techniques, including injection molding, compression molding, machining, 3D printing, forging, casting and combinations thereof. Any suitable material(s) may be used to make the atomizer, e.g., thermoplastics such as polypropylene, nylon, polytetrafluoroethylene, or acetal; metals such as brass and stainless steel; ceramics such as aluminum oxide; and combinations thereof.

Figure 5:
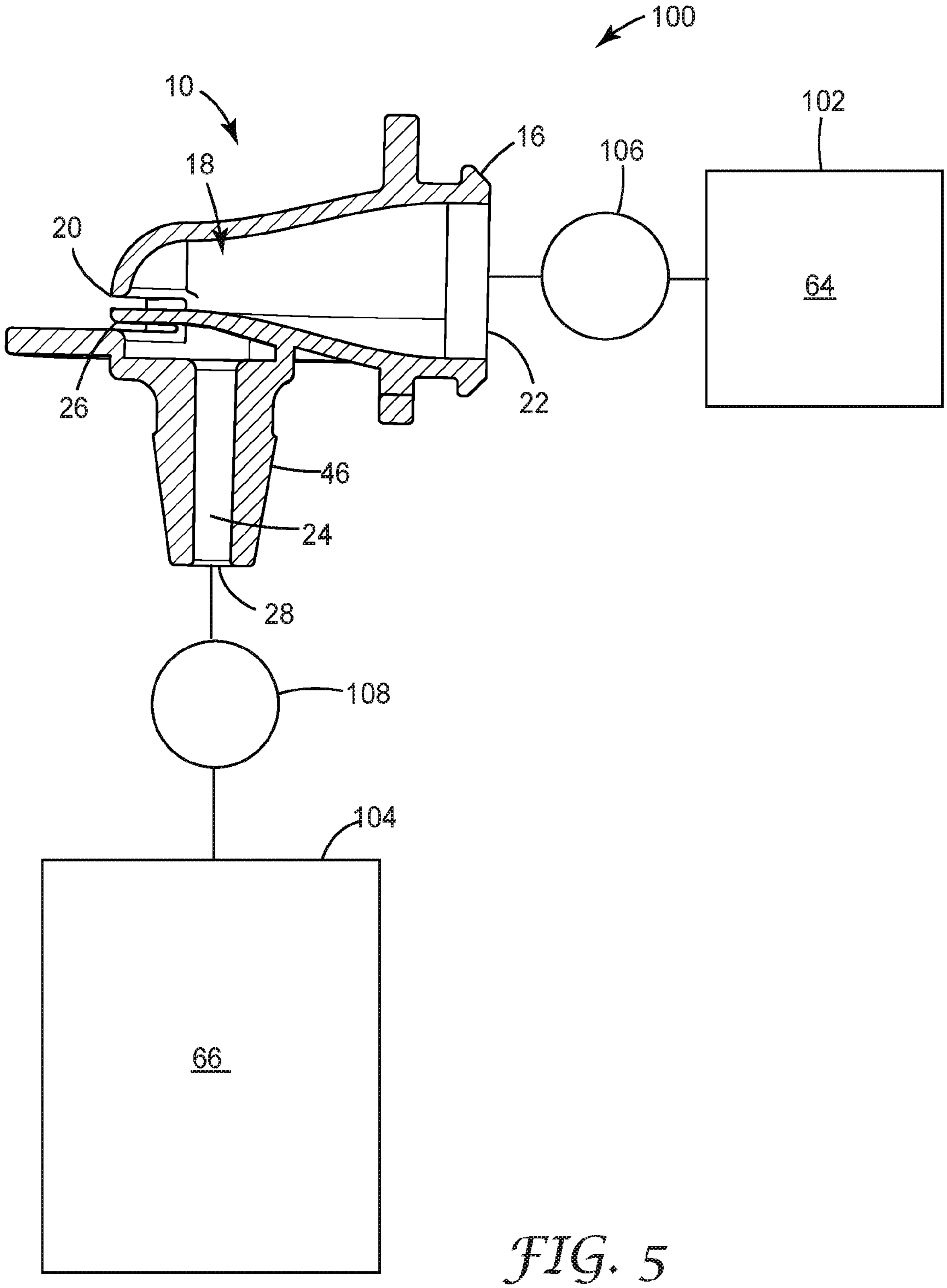
FIG. 5 is a cross-sectional view of a spraying apparatus comprising the fluid atomizer of FIG. 2.

FIG. 5 exemplifies a spraying apparatus 100 using the atomizer illustrated in FIGS. 2-4. In addition to the atomizer 10 described above, the apparatus 100 includes a first fluid source 102 having a first fluid 64 and a second fluid source 104 having a second fluid 66. The first fluid source 102 is fluidly connected to the first fluid inlet 22, and the second fluid source 104 is fluidly connected to the second fluid inlet

28 using the attachment features previously described. The attachment is preferably releasable but may be permanent in some embodiments.

The first and second fluid sources 102, 104 may comprise any suitable container, reservoir or housing that can be directly or indirectly (e.g., via a conduit) attached to the first fluid inlet 22 and second fluid inlet 28, respectively, of the atomizer 10. The first and second fluid sources 102, 104 may each be reusable or disposable and can come prefilled with fluid or be fillable on site.

In some embodiments, at least one of the first fluid source 102 and second fluid source 104 is pressurized. In some embodiments, the first fluid source 102 is pressurized. In some embodiments, the second fluid source 104 is not pressurized. In other embodiments, the second fluid source 104 is not pressurized by means other than hydrostatic pressure (e.g., the second fluid source 104 is positioned vertically above the atomizer).

In some embodiments, the first fluid 64 is a gas (e.g., air, nitrogen, oxygen and steam). In some embodiments the second fluid 66 is a liquid (e.g., paint, lacquer, stain, varnish and water). In preferred embodiments, the first fluid 64 is a gas, more particularly a pressurized gas and the second fluid 66 is a liquid.

The spraying apparatus may optionally include one or more actuators to manage the fluid flow within the apparatus. As illustrated in FIG. 5, a first fluid actuator 106 manages the flow of fluid 64 from the first fluid source 102 to the first fluid inlet 22. Similarly, a second fluid actuator 108 manages the flow of fluid 66 from the second fluid source 104 to the second fluid inlet 28. The first and second fluid actuators 106, 108 can be of the same type or different types. Exemplary actuators include hand triggers, needle valves, ball valves, poppet valves, cross-slit valves, dome valves, duckbill valves, umbrella valves and combinations thereof.

The spraying apparatus of the present application can be used in a variety of applications involving the atomization of fluid. In one embodiment, the spraying apparatus is used to coat a substrate. The atomizer 10 is placed in front of a substrate (not shown). The first fluid 64 is directed through the first fluid outlet 20 while the second fluid 66 is directed through the second fluid outlet 26. At least a portion of the second fluid 66 is atomized by the first fluid 64 to produce a flat fan pattern of atomized fluid. The substrate is then coated with the atomized fluid.

The spraying apparatus may be used, for example, in vehicle repair body shops to apply liquid coating media such as primer, paint and/or clearcoat to vehicle parts. In such applications, the first fluid is typically a gas, such as pressurized air. The second fluid is typically a liquid which may be, but is not required to be, pressurized. In some embodiments, the second fluid is not pressurized by means other than hydrostatic pressure.

The spraying apparatus, and atomizer contained therein, is designed to take advantage of the Coanda Effect in certain instances. This effect is illustrate in FIGS. 6 and 7, where the first fluid 64 is a pressurized gas and the second fluid 66 is a liquid. As the pressurized gas is expelled through the first fluid outlet 20, it deflects towards the attraction surface 30 and creates a low pressure zone 62 adjacent the second fluid outlet 26. The low pressure zone 62 draws, or assists drawing, the liquid through the second fluid outlet 26 into the low pressure zone 62 and the path of the pressurized gas. A shearing force of the pressurized gas on the liquid leads to atomization of the liquid.

Although the low pressure zone 62 is often sufficient to pull the second fluid 66 through the second fluid outlet 26, it should be understood that the second fluid 66 may be dispensed while under hydrostatic pressure and/or pressurized by an external source of air. For example, is some embodiments, the second fluid source 104 may be elevated above the atomizer 10 during operation. In such instances, dispensing of the liquid from the second fluid outlet will be influenced by the both Coanda Effect and the hydrostatic pressure arising from the position of the second fluid source 104 above the atomizer 10. In other embodiments, the liquid may be pressurized by, for example, a pump or an external source of air.

Figure 6:
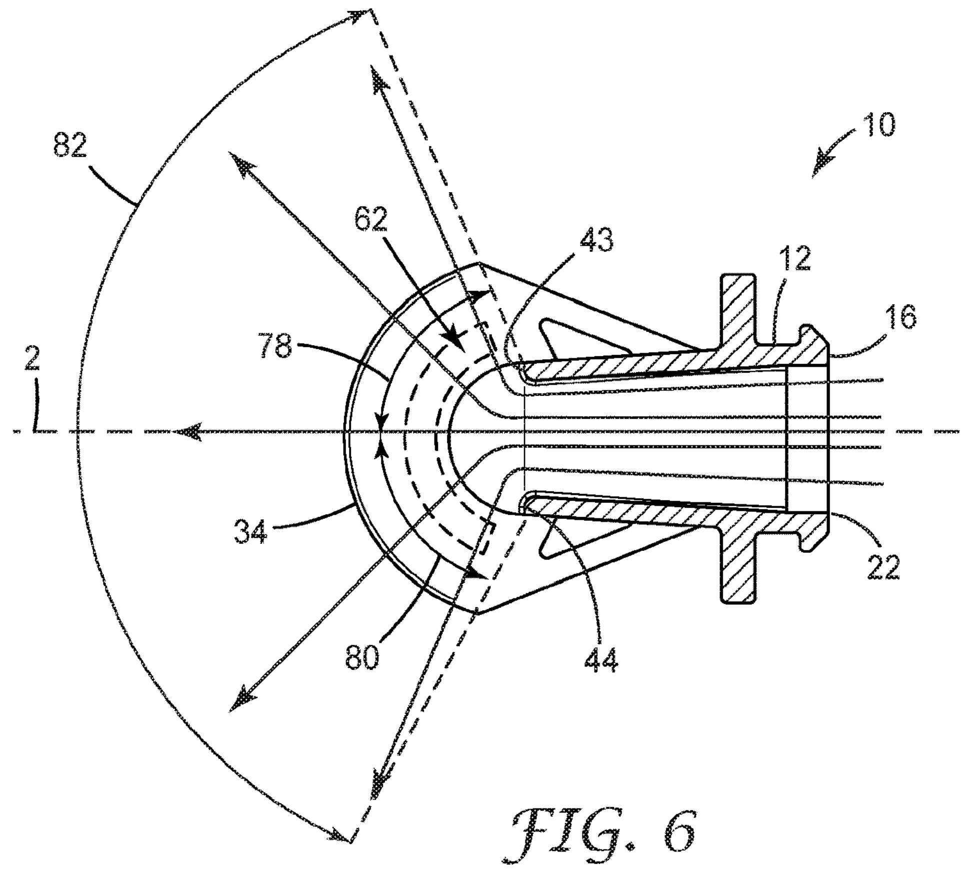
FIG. 6 is a cross-sectional top view of the fluid atomizer of FIG. 2.
Figure 7:
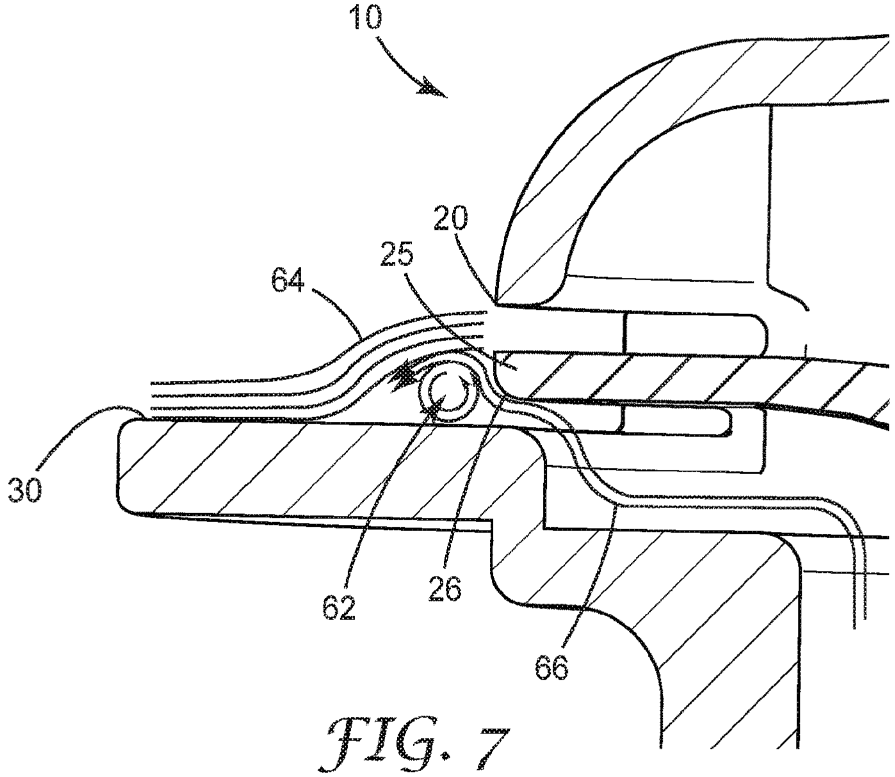
FIG. 7 is a cross-sectional side view of a front portion of the fluid atomizer of FIG. 2.

The shaping of the atomized fluid is facilitated by the arcuate slit 23 of the first fluid outlet 20 that spreads the atomized liquid into a flat-fan pattern as illustrated in FIG. 6. The size of the flat fan pattern, as represented by the length of arc 82, is influenced by the dimensions of the first fluid outlet 20, the dimensions of the second fluid outlet 26, and/or the location of the optional first and second walls 70, 72, as depicted in FIG. 9.

Since the function of shaping and atomizing are combined into one air-stream, the atomizers of the present disclosure are much simpler than the traditional air-atomizing, air-spray, air-assist or air-blast atomization methods that require the adjustment of multiple air streams. Moreover, there is no need for one or more separate streams of pressurized air to shape the atomizer fluid, thus reducing the pressurized air consumption by as much as half.

Other variations on the atomizers of the present disclosure are within the scope of the present application. For example, FIGS. 10 and 11 illustrate another embodiment of a fluid atomizer of the present application. The atomizer 210 contains many of the same features already described above with respect to the atomizer 10 in FIGS. 2-4, including a body 212, first and second fluid outlets 220, 226 disposed in a front surface 214 of the body 212, and a shelf 229 protruding from the front surface 214. The first fluid outlet 220 defines an arcuate slit 223. The second fluid outlet 226 is located between the first fluid outlet 220 and the shelf 229. The atomizer 210 also includes a first fluid inlet 222 and a second fluid inlet 228. A connection mechanism 217 can be proximate or adjacent to the first fluid inlet 222. In at least one embodiment, a portion of the front surface 214 can be semi-hemispherical or dome shaped.

Atomizer 210 differs from atomizer 10 in the overall shape of the body 212 and, more particularly, in the structure of the second fluid outlet 226. As illustrated in FIGS. 10 and 11, the second fluid outlet 226 is partitioned into a plurality of openings 207. Although the openings are all of the same shape and size, it should be understood that the openings could vary in shape and/or size.

FIG. 13 illustrates an atomizer 410. The atomizer 410 can be configured similarly to atomizers 110, except that the first fluid outlet 420 and the second fluid outlet 426 are separated by the wall 425 with scalloped portions formed therein. Scalloped can mean one of a continuous series of circle segments or angular projections forming a border.

The atomizer 410 can have a body 412 having a front surface 414, a rear surface and a body axis 2 extending from the front surface 14 to the rear surface. A first fluid passageway is disposed within the body 12 and comprises a first fluid outlet 420 disposed in the front surface 14 of the body 12 and a first fluid inlet. The first fluid outlet 420 defines an arcuate slit. The first fluid outlet 420 can have a top 440 (defined by a portion of a hemisphere) and a bottom 442 (defined by the wall 425).

The second fluid outlet 426 can have a top 428 and a bottom 450. The top 428 can be defined by the wall 425. The bottom 450 can be defined by the shelf 429 and the attraction surface 430. The top 428 and/or the bottom 442 can have a depressed portion 403 which may be configured to alter the exit velocity of the first fluid and/or the second fluid. In at least one embodiment, protruding portions of the top 428 can abut or contact the bottom 450 shelf 429 forming an opening 405 is formed in the depressed portion. Similar to atomizer 110, atomizer 410 can also include first and second walls 470, 472 that may be adjustable by a user to adjust the resulting pattern of fluid that is deposited.

Figure 15:
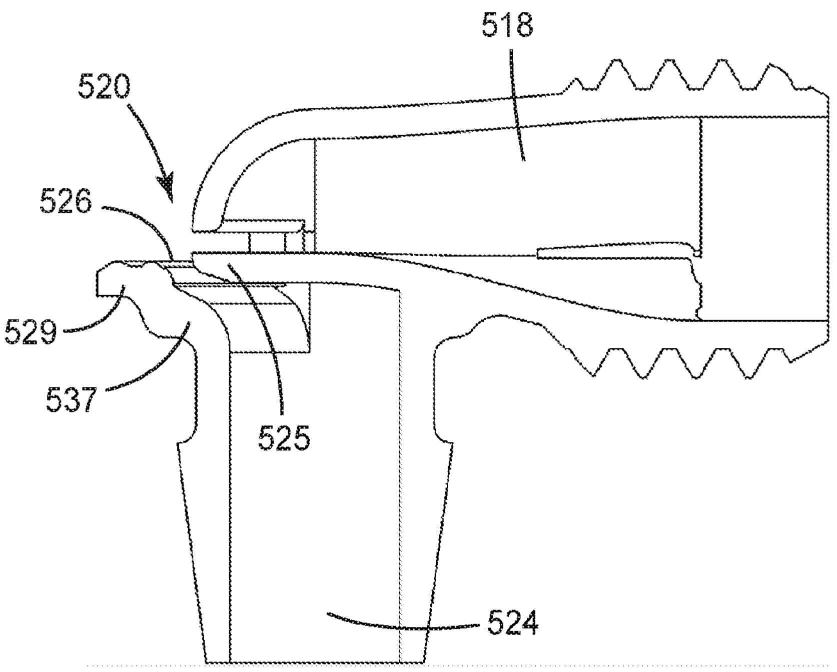
FIG. 15 is a cross-sectional side view of the fluid atomizer of FIG. 14.
Figure 16:
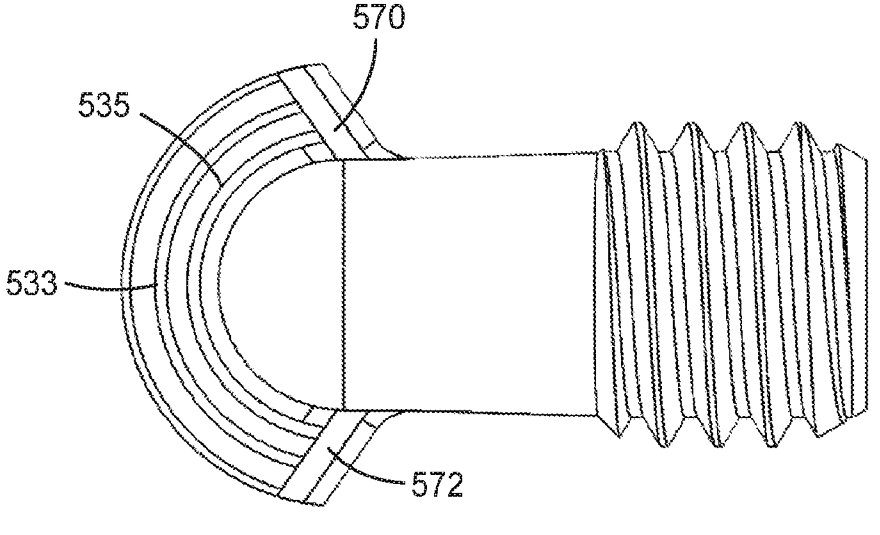
FIG. 16 is a top view of the fluid atomizer of FIG. 14.

FIGS. 14-16 illustrates an atomizer 510 similar to atomizer 110 except that atomizer 510 can include air-modulating features 533, 535 on the attraction surface 530 of the shelf 529. For example, the atomizer 510 can have a body 512 having a front surface 514 and a rear surface 516. The body 512 can have a connection mechanism 517 formed proximate to the rear surface.

A first fluid passageway 518 and a second fluid passageway 524 can be formed from the body 512. A wall 525 can separate the first fluid passageway 518 and the second fluid passageway 524. The first fluid outlet 520 can be formed from the front surface 514 and be fluidically coupled to the first fluid passageway 518. The second fluid outlet 526 can be fluidically coupled to the second fluid passageway 524. The body 512 can also include a shelf that extends past the front surface 514. In at least one embodiment, the shelf can have a connecting portion 537 that connects the shelf 529 to the body 512. For example, the connecting portion 537 is angled from the shelf 529 such that an opening is formed between the wall 525 and an outer surface of the body 512 (proximate to an inlet).

The air-modulating features 533, 535 can be protrusions that are raised from the surface of the shelf 529. In at least one embodiment, the air-modulating features 533, 535 can be continuous along a portion of or the entire shelf. In at least one embodiment, the air-modulating features 533, 535 can extend a portion of or the entire arch between the two walls 570, 575. In at least one embodiment, the air-modulating features 533, 535 can be the same level as the wall 525 or sit slightly below the level of the wall 525. The air-modulating features 533, 535 can be configured to produce flow-excited Helmholtz resonance of one of or both of the combined fluid mixture. It is thought that the Helmholtz resonance can alter the atomization and mixing processes between the first and second fluids. As shown, the air-modulating feature 533 is a larger raised arch while the air-modulating feature 535 is a smaller raised arch.

FIG. 17 illustrates an atomizer 610 having a body 612. The atomizer 610 is similar to atomizer 510 except that the air-modulating features 633 are different. As shown, the air-modulating features 633 are a plurality of raised dimples that extend past the attraction surface 630 of the shelf 629. In at least one embodiment, the air-modulating features 633 can be depressed dimples. The air-modulating features 633 can be arranged in one or two rows and may be at least partially radially aligned based on the flow of the first and second fluid.

Figure 18:
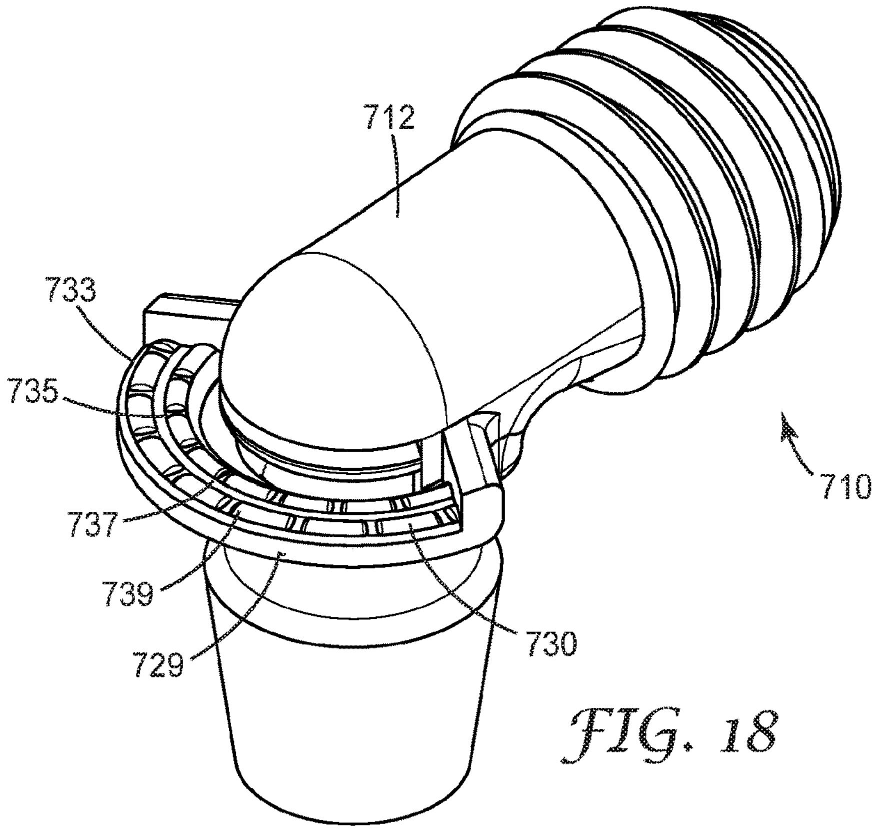
FIG. 18 is a perspective view of another embodiment of the fluid atomizer of the present application.

FIG. 18 illustrates an atomizer 710 having a body 712. The atomizer 710 is similar to atomizer 510 except that the air-modulating features 733, 735 on the attraction surface 730 of the shelf 729 can further have channels or troughs 735 formed therein. For example, the air-modulating feature 735 can be arch-like in shape except for a plurality of channels 737 can be formed therein. Air-modulating feature 733 can also be arch-like in shape following the same contours as air-modulating feature 735 and have a plurality of channels 739 formed therein. In at least one embodiment, channels 737 are not aligned with channels 739.

Thus, the present disclosure provides, among other things, atomizers, systems that contain such atomizers, and methods that utilize such atomizers. Various features and advantages of the present disclosure are set forth in the following claims.

What is claimed is:

1. An atomizer comprising:

a body including a front surface, a rear surface and a body axis extending from the front surface to the rear surface, the body comprising:

a first fluid outlet disposed in the front surface of the body, a first fluid inlet, and a first fluid passageway connecting the first fluid inlet with the first fluid outlet, the first fluid outlet defining an arcuate slit;

a second fluid outlet disposed in the front surface of the body, a second fluid inlet, and a second fluid passageway connecting the second fluid inlet with the second fluid outlet; and a shelf protruding from the front surface of the body, wherein the second fluid outlet is located between the first fluid outlet and the shelf, wherein the first fluid outlet comprises a first end, a second end, a top and a bottom that together define the arcuate slit, and wherein the second fluid outlet comprises a first end, a second end, a top and a bottom, and wherein at least one of the top, the bottom, the first end and the second end of the first fluid outlet or second fluid outlet comprise a groove.

2. The atomizer of claim 1, wherein the groove is scalloped.

3. A spraying apparatus comprising:

an atomizer comprising:

a body including a front surface, a rear surface and a body axis extending from the front surface to the rear surface, the body comprising:

a first fluid outlet disposed in the front surface of the body, a first fluid inlet, and a first fluid passageway connecting the first fluid inlet with the first fluid outlet, the first fluid outlet defining an arcuate slit;

a second fluid outlet disposed in the front surface of the body, a second fluid inlet, and a second fluid passageway connecting the second fluid inlet with the second fluid outlet; and a shelf protruding from the front surface of the body, wherein the second fluid outlet is located between the first fluid outlet and the shelf, a first fluid source fluidly connected to the first fluid inlet; and a second fluid source fluidly connected to the second fluid inlet, wherein the first fluid source comprises a gas and the second fluid source comprises a liquid, and wherein the second fluid source is not pressurized by means other than a hydrostatic pressure.

4. A method of using a spraying apparatus, the method comprising:

placing an atomizer in front of a substrate, wherein the atomizer comprises:

a body including a front surface, a rear surface and a body axis extending from the front surface to the rear surface, the body comprising:

a first fluid outlet disposed in the front surface of the body, a first fluid inlet, and a first fluid passageway connecting the first fluid inlet with the first fluid outlet, the first fluid outlet defining an arcuate slit;

a second fluid outlet disposed in the front surface of the body, a second fluid inlet, and a second fluid passageway connecting the second fluid inlet with the second fluid outlet; and a shelf protruding from the front surface of the body, wherein the second fluid outlet is located between the first fluid outlet and the shelf, wherein the spraying apparatus further comprises a first fluid source fluidly connected to the first fluid inlet and a second fluid source fluidly connected to the second fluid inlet;

dispensing a first fluid through the first fluid outlet;

dispensing a second fluid through the second fluid outlet;

atomizing at least a portion of the second fluid to produce a flat fan pattern of atomized fluid; and coating the substrate with the atomized fluid, wherein the first fluid is pressurized and the second fluid is not pressurized by means other than a hydrostatic pressure.

* * * * *